United States Patent [19]

Hogg et al.

[11] Patent Number: 4,841,697
[45] Date of Patent: Jun. 27, 1989

[54] GLASS PANEL MOUNTING ASSEMBLY

[75] Inventors: Jeffrey Hogg, Collingham; Joseph T. Harwood, Pudsey, both of England.

[73] Assignee: Town Centre Securities, PLC, West Yorkshire, Great Britain

[21] Appl. No.: 133,027

[22] Filed: Dec. 15, 1987

[51] Int. Cl.$^4$ .............................................. E06B 3/00
[52] U.S. Cl. ....................................... 52/208; 256/24; 198/335
[58] Field of Search .................... 256/31, 24, 73, 68; 52/208

[56] References Cited

U.S. PATENT DOCUMENTS

| | | | |
|---|---|---|---|
| 3,991,877 | 11/1976 | Kraft et al. | 198/335 |
| 4,067,548 | 1/1978 | Murphy | 256/24 |
| 4,646,907 | 3/1987 | Streibig et al. | 198/335 |
| 4,690,383 | 9/1987 | Batcheller | 256/24 |

Primary Examiner—Carl D. Friedman
Assistant Examiner—Creighton Smith
Attorney, Agent, or Firm—Dominik, Stein, Saccocio, Reese, Colitz & Van Der Wall

[57] ABSTRACT

A glass panel mounting assembly (10) which comprises a laminated glass panel (11) which is resiliently deflectable, a U-shaped holder (12) in which one edge (16) of the panel (11) is rigidly mounted, and adjustable securing means (17) extending between the metal limbs (13, 14) of the holder (12) and below the panel edge (16) in order to clamp the panel edge between the metal limbs. A pair of packings (18) are arranged one between each side of the panel edge and the inner face of the respective adjacent limb of the holder, each packing being made of a hard plastics or elastomeric material having a slight degree of resilience, and sealant material (20) is arranged substantially to fill the remainder of the channel (15) which is defined between the free end of the limbs (13, 14) and the packings (18). The arrangement of the U-shaped holder (12), the packings (18) and the sealant material (20) is such as to allow the panel to be deflected resiliently under a transversely applied loading, from its unloaded position, about the mounting of the panel edge (16) in the holder and substantially without any permanent deformation of the holder (12), the packings (18) and the sealant material (20), whereby the panel automatically restores itself to the unloaded position upon removal of the applied loading.

8 Claims, 4 Drawing Sheets

GLASS PANEL MOUNTING ASSEMBLY

This invention relates to a glass panel mounting assembly, in which a glass panel is fixedly mounted along at least one edge thereof.

The present invention has been developed primarily, though not exclusively, with a view to providing a glass panel mounting assembly which can be used to form a balustrade. The possible use of glass panels as balustrades on stairways, landings and walk ways is of interest to builders, developers and architects, as it would provide visually pleasing aspects which may appeal particularly in shopping precincts and office complexes. However, in that balustrades are usually mounted securely at their lower end only, they form cantilever type assemblies which must be mounted sufficiently rigidly so as to be able to resist substantial bending stresses about their lower ends.

When a balustrade is made of linked wooden or metal upright supports, satisfactory resistance to applied transverse loads can readily be borne, provided that each support is securely anchored at its lower end, and the supports are arranged at close spacings from each other. In this way, any transverse point load applied e.g. to a hand rail, will be shared between the supports present in the region of the applied load. Also, wooden, and metal supports can readily be made to resist applied bending loads and, if they are caused to yield, have sufficient resilience to revert to the original position upon removal of the bending load. Finally, each support can be fixedly mounted or anchored at its lower end in simple and secure manner.

However, the desired possible use of glass panels as balustrades, for aesthetic purposes, imposes a number of structural problems which must be overcome. First of all, a glass panel for use as a balustrade typically might be 100 cm square and, to have sufficient strength and impact resistance, must be of appreciable thickness and therefore also be correspondingly heavy. Secondly, this means that any cantilever type fixing at the lower edge of the panel must be sufficiently strong and robust as to bear the weight of the panel, and yet also resist turning moments applied to the lower region of the panel when transverse loads are applied to the panel.

Thirdly, although the panel must be sufficiently strong so as to resist applied transverse loads, from an impact point of view, the panel must also have a certain degree of resilience so that it can yield, rather than fracture, when excessive loads are applied e.g. one or more bodies are propelled against the panel. This third requirement for the glass panel is counter to the first requirement, in that an excessively thick panel (to meet the first requirement) will lower the resilience of the panel and hence reduce the ability of the panel to yield rather than fracture.

Fourthly, given that the major part of the support for a glass balustrade would be via a cantilever mounting along its lower edge, this mounting must be sufficiently strong as to allow the upper edge of the panel e.g. a handrail thereon to yield laterally to a small extent while the lower edge of the panel remains firmly engaged in the mounting. This fourth requirement is particularly difficult to meet, in that a glass panel cannot readily be secured in position by bolts taken through the panel, as would be suitable for a metal balustrade, in view of the relatively poor resistance of glass to compressive and shear loads.

It has been proposed to provide a glass balustrade which comprises a panel of toughened glass having its lower edge mounted in a metal U or channel formation, the edge being held in position and engaged on either side by hardwood packing which forms a metal/hardwood packing/glass/hardwood packing/metal sandwich. The disadvantage of using a toughened glass panel is that any failure of the panel results in disintegration of the panel into small pieces, with resultant loss of lateral protection provided by the balustrade, and possible injury to people on a lower floor. The disadvantage of using hardwood packing, as shown by tests, is that transverse loads applied to the panel cause a certain amount of pivoting movement of the lower edge of the panel in the channel mounting, accompanied by permanent deformation of the hardwood packing. This results in the panel not returning completely to its original upright position, upon removal of the load, which is both unsightly and also unsafe, as well as involving the risk, upon a subsequent loading of the panel, of the lower edge rising out of its mounting.

The present invention therefore seeks to provide a construction of balustrade, using a balustrade panel of glass, which is able (1) to act satisfactorily as lateral restraint in normal circumstances, (2) can yield laterally, rather than fracture, to a limited extent about its lower edge mounting when an excessive transverse load is applied to the panel, and (3) provides a secure mounting at the lower edge of the panel which substantially does not deform permanently any part of the mounting, and yet which allows pivotable yielding of the panel about the mounting under transverse load.

According to the invention there is provided a glass panel mounting assembly which comprises:

a glass panel which is resiliently deflectable and which has at least a first edge;

a U-shaped holder in which the first edge of the panel is securely mounted, said holder comprising a pair of substantially parallel metal limbs, each having an inner face and a free end, which define a receiving channel in which the first edge is received;

adjustable securing means extending between the metal limbs and below the first edge in order to clamp first edge between the metal limbs;

a pair of packings arranged one between each side of the first edge and the inner face of the respective adjacent limb of the holder, each packing being made of a material having a slight degree of resilience; and sealant material arranged substantially to fill the remainder of the channel which is defined between the free end of the limbs and the packings:

in which the arrangement of the U-shaped holder, the packings and the sealant material constitutes holding means for allowing the panel to be deflected resiliently under a transversely applied loading, from its unloaded position, about the mounting of the first edge in the holder and substantially without any permanent deformation of the holder, the packings and the sealant material, whereby the panel automatically restores itself to the unloaded position upon removal of the applied loading.

A glass panel mounting assembly according to the invention is particularly suitable for use as a glass balustrade, in which the aesthetically pleasing features of a glass panel can be obtained, while providing an assembly which can meet safety standards from a structural point of view.

The use of a laminated glass panel, preferably comprising two glass layers, imparts a required degree of resilience to the panel, allowing it to deflect about its held edge under applied transverse load, rather than fracturing. Furthermore, even if one of the layers should be so stressed under load that it fractures, the laminated nature of the panel will mean that the structural integrity of the panel will be at least partly maintained, and glass particles should not be released to cause possible injury.

The packings are made of hard, though slightly resilient material, so as to permit a very limited degree of turning movement of the edge region of the panel in the holder under an applied transverse load, the nature of the packing material being such that it does not damage or abrade the panel while undergoing slight compressive deformation, but yet it can be fully restored to its original shape in the channel when the panel is unloaded.

Careful selection of packing material is required to meet the design criteria, and one preferred material is a polycarbonate. However, other hard, though slightly resilient plastics or elastomeric materials may be used, including extruded UPVC, extruded silicone, polypropylene, Lexan polycarbonate, nylon, tuffnel, neoprene gaskets, rubber, plasterzote, Belzona Molecular plastics materials, cellular supertrims and "lead" plastics.

The sealant material which substantially fills the remainder of the channel which is defined between the free end of the limbs of the holder and the packings acts both as a sealant, and also provides a resilient cushioning of the permitted very limited turning movement of the edge region of the glass panel in the holder so as to prevent the generation of any localised high stresses applied to the panel which might otherwise occur if the panel should be deflected into point or line contact with an edge of one of the free ends of the limbs of the holder.

A preferred material to be used as the sealant is Arbocol 682m sealant, though other sealant materials which may be used include Evode 2843 and 2813 sealant, and other Epoxy sealants.

Conveniently, the panel edge rests on a hardwood packing within the channel defined in the holder, to provide support for the weight of the panel prior to tightening of the adjustable securing means.

Preferably, a handrail is provided along the free edge of the panel (opposite to the edge mounted in the U-shaped holder), and this may be made of stainless steel with a hardwood infill.

In the formation of a balustrade run composed of a plurality of glass panels, the panels may be arranged with a close spacing therebetween in a common U-shaped holder. In order to provide mutual support against applied transverse loadings, hand rail portions of adjacent panels may be coupled together.

One embodiment of glass panel mounting assembly according to the invention will now be described in detail, by-way of example only, with reference to the drawings, in which.

Figure 1:
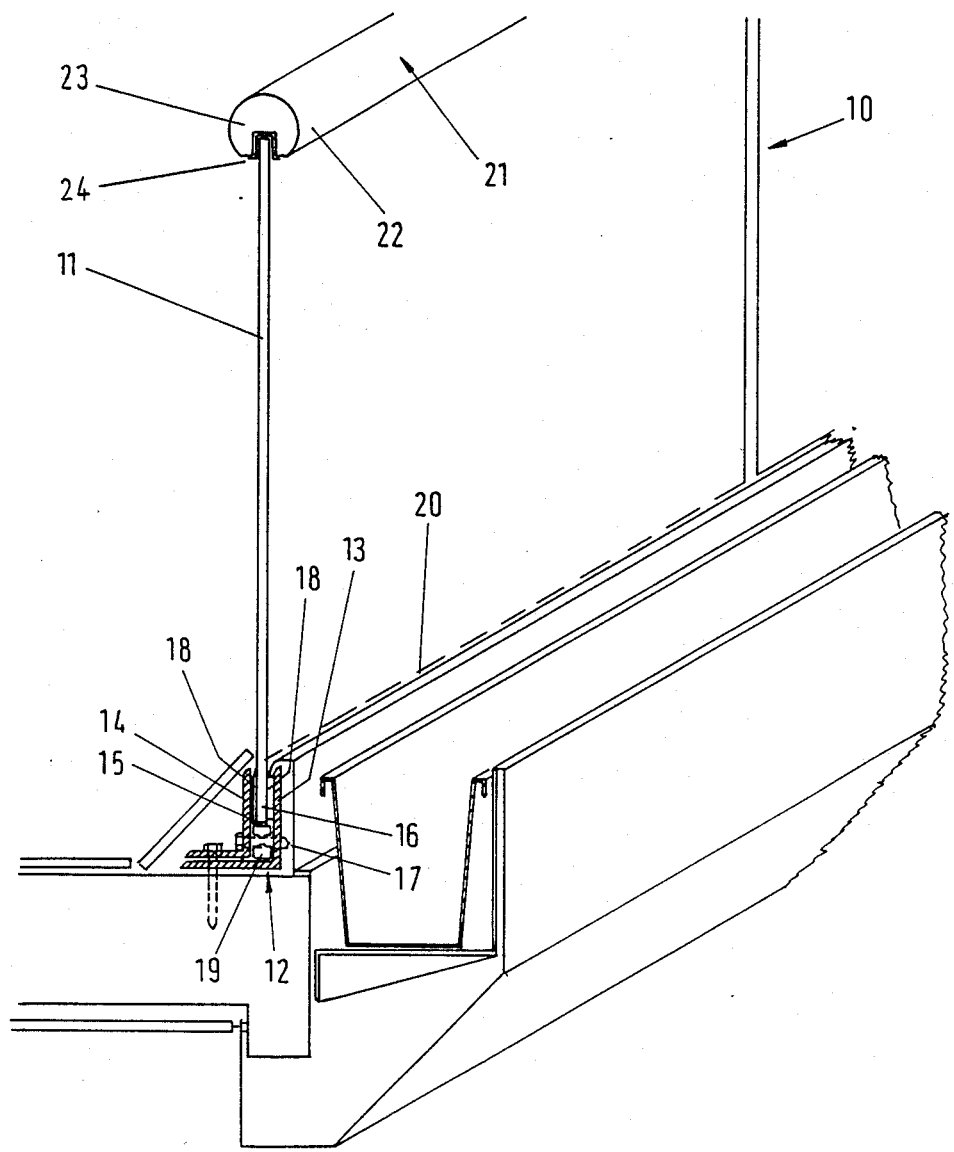
FIG. 1 is a perspective illustration of one panel of a glass balustrade.
Figure 1A:
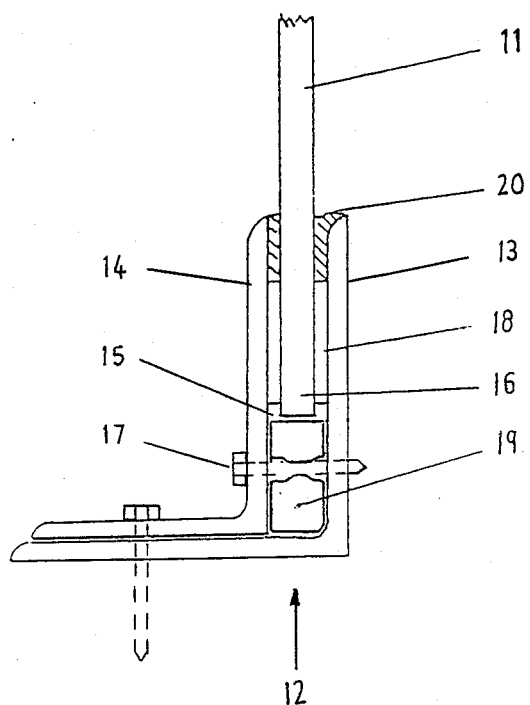
FIG. 1a is a detailed end view of part of the glass balustrade.

Referring now to the drawings, the embodiment of the invention takes the form of a glass balustrade panel assembly, which is shown in FIGS. 1 and 1a. The assembly is designated generally by reference 10 and comprises a laminated glass panel 11 of at least two glass layers so as to be resiliently deflectable. For example, two sheets of toughened glass bonded by a resinous material may be used. The present invention can also be applied to a glass panel which is simply a single sheet of toughened glass, although a laminated panel is preferred. The lower edge of the panel 11 is rigidly mounted in a U-shaped holder 12, the holder 12 comprising a pair of substantially parallel metal limbs 13 and 14 which define a receiving channel 15 in which the lower edge 16 of the panel 11 is received. Adjustable securing means, in the form of longitudinally spaced threaded fasteners 17, extend between the metal limbs 13 and 14 and below the panel edge 16 in order to clamp the panel edge between the metal limbs.

Packing material is provided within the channel 15 in order to hold the panel edge 16 rigidly in the holder 12, this comprising packings 18 arranged one between each side of the panel edge 16 and the inner face of the respective adjacent limb 13,14 of the holder 12. Each packing is made of a hard plastics or elastomeric material having a slight degree of resilience, for a purpose which is described in more detail below. The bottom edge of the panel 11 rests on hardwood packing 19 in the bottom of the channel 15, which bears the weight of the panel, at least prior to full clamping of the panel edge by tightening of the fasteners 17.

Sealant material 20 is arranged substantially to fill the remainder of the channel 15 which is defined between the free ends of the limbs 13,14 and the upper edges of the packings 18.

The arrangement of the U-shaped holder 12, the packings 18 and the sealant material 20 is such as to allow the panel 11 to be deflected resiliently from its usual unloaded position, upon application of a transversely applied loading e.g. a person impacting with a handrail 21, or with the panel. Upon application of such a load, the inherent resilience of the laminated glass panel 11 allows it to deflect about the substantially rigid mounting of the panel edge 16 in the holder 12, and substantially without any permanent deformation of the holder 12, the packings 18 and the sealant material 20. Thereby, upon removal of the applied transverse loading, the panel 11 automatically restores itself to the unloaded position.

The material from which the packings are made is a hard, though slightly resilient material, such as to permit a very limited degree of turning movement of the edge region of the panel in the holder, the nature of the packing material being such that it does not damage or abrade the panel while undergoing sight compressive deformation, but yet being able to be fully restored to its original shape in the channel 15 when the panel is unloaded. Careful selection of packing material is required to meet the desired criteria, and one preferred material is polycarbonate. However, other hard, though slightly resilient plastics or elastomeric materials may be used, including extruded UPVC, extruded silicone, polypropylene, Lexan polycarbonate (made by General Electric), nylon, tuffnel, neoprene gaskets, rubber, plasterzote, Belzona Molecular plastics materials (made by Belzona Ltd, Harrogate, England), cellular supertrims and "lead" plastics.

The sealant material 20 has a dual function, in that it acts both as a sealant, and also to provide a degree of resilient cushioning for the permitted very limited turning movement of the panel edge in the holder 12, so as to prevent any localised high stressing of the panel to take place, by point or line contact with edges of the free ends of the limbs 13, 14. The preferred sealant material to be used is Arbokol 682 sealant, though in general any polysulphide sealant material may be used including Evode 2843 and 2813 sealant (manufactured by Evo-Stik) and any epoxy sealant.

It will be evident from FIG. 1 that the mounting arrangement provided for the lower edge 16 of the glass panel 11 is a cantilever type mounting, but additional restraint against lateral displacement of the panel may be provided, as will be described later with reference to FIG. 2.

As mentioned above, a handrail 21 is provided along the upper edge of the panel 11, and this may be made of a stainless steel cover 22 having a hardwood infill 23, these together defining a channel in which the upper edge of the panel 11 is received. A metal (e.g. stainless steel) channel-section member 24 may be fitted over the upper edge of the panel 11, for facilitating mounting of the handrail on the panel. The member 24 may be detachably mounted to the panel 11 and/or detachably mounted within the infill 23 so as to allow easy replacement of the glass panel 11 when required.

In a balustrade run, composed of a plurality of panels 11 arranged side by side, with close spacing therebetween, in a common holder, mutual support against applied transverse loadings may be provided by coupling together hand rail portions of adjacent panels. Detailed features of the hand rail constructions and coupling together are shown in FIG. 2.

Figure 2A:
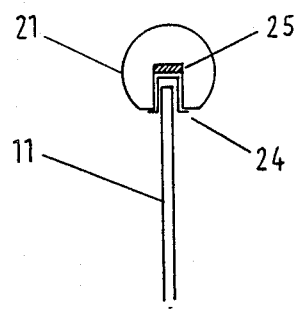
FIG. 2 illustrates detail views of a hand rail assembly for use with the balustrade panel.
Figure 2B:
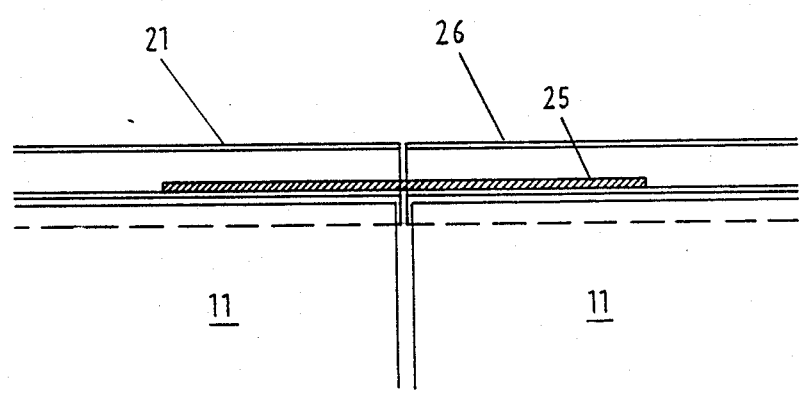
Figure 2C:
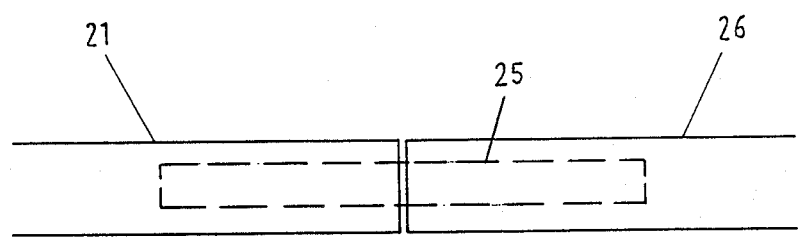

FIG. 2(a) is a sectional view of the upper portion of a panel and handrail assembly in which a stabilising strip 25 is provided within the infill 23 of the handrail. The function of the stabilising strip is shown in FIGS. 2(b) and 2(c): from these it can be seen that the strip 25 acts as a strengthening link between two adjacent panels 11 with respective handrails 21 and 26.

Figure 2D:
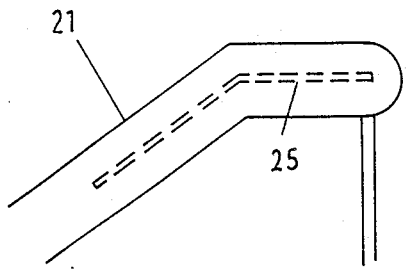

FIG. 2(d) shows a stabilising strip used at one end of a balustrade run, for example at the top of a stairway.

Figure 2E:
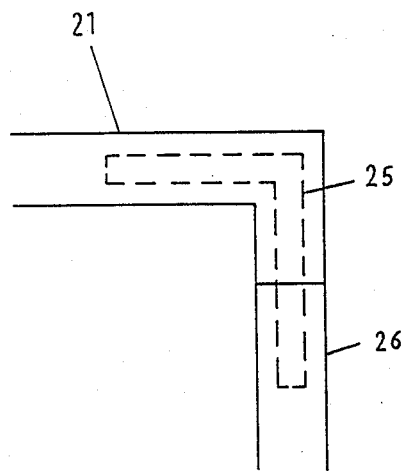
Figure 2F:
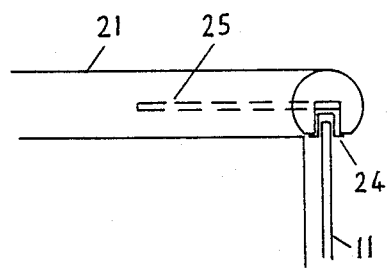
Figure 2G:
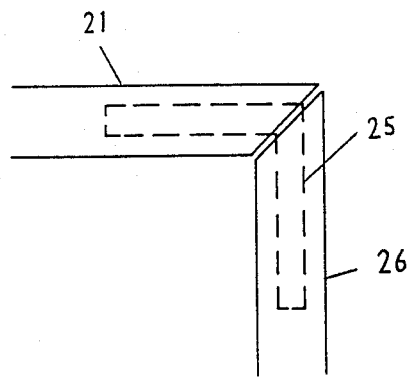

FIGS. 2(e), 2(f) and 2(g) show a corner portion of a balustrade run, with 2(e) and 2(g) being alternative plan views and 2(f) being a sectional view. FIG. 2(g) illustrates an embodiment in which each panel has a respective handrail 21 or 26 with the handrail joint (that is, the gap between two handrails 21 and 26) being at the corner, i.e. at the panel joint (the gap between the two panels). The stabilising strip 25, which is L-shaped in this instance, acts to couple together the two panel and handrail assemblies. As an alternative however, as shown in FIG. 2(e) it is not necessary for the handrail joints to coincide with the panel joints : instead, the handrail joints may be staggered relative to the panel joints. The L-shaped stabilising strip 25 may in this case be extended if necessary to cover the handrail joint.

It is also possible to stagger joints of the channel-section member 24 relative to the handrail joints, or to provide the member 24 in an elongated form to extend along several handrails. This will further strengthen he balustrade run and may permit the stabilising strip 25 to be omitted whilst still retaining sufficient mutual support of the panels.

We claim:

1. A glass panel mounting assembly which comprises in combination:
   a glass panel which is resiliently deflectable and which has at least a first edge;
   a U-shaped holder in which the first edge of the panel is securely mounted, said holder comprising a pair of substantially parallel metal limbs each having an inner face and a free end and which define a receiving channel having an upper portion and a lower portion in which the first edge is received;
   adjustable securing means extending between the metal limbs and below the first edge in order to clamp the first edge between the metal limbs;
   a pair of packings positioned only within the lower portion of the channel and arranged one between each side of the first edge and the inner face of the respective adjacent limb of the holder, each packing being made of a material having a first resilience; and
   sealant material positioned within the upper portion of the channel, the sealant material being made of a resilient material having a second resilience which is substantially greater than the first resilience of the packings
   whereby the arrangement of the U-shaped holder, the packings and the sealant material constitutes holding means for allowing the panel to be deflected resiliently under a transversely applied loading, from its unloaded position, about the mounting of the first edge in the holder and substantially without any permanent deformation of the holder, the packings and the sealant material, such that the panel automatically restores itself to the unloaded position upon removal of the applied loading.

2. A glass panel mounted assembly according to claim 1, in which the packing material is at least one of a polycarbonate, extruded UPVC, extruded silicone, polypropylene, Lexan polycarbonate, nylon tuffnel, neoprene gaskets, rubber, plasterzote, Belzona Molecular plastics materials, cellular supertriss and "lead" plastics.

3. A glass panel mounting assembly according to claim 1, in which the sealant material is arranged to provide resilient cushioning of permitted very limited turning movement of a region of the glass panel adjacent the first edge in the holder so as to prevent the generation of any localised high stresses applied to the panel which might otherwise occur if the panel should be deflected into localised line contact with an edge of one of the free ends of the limbs of the holder.

4. A glass panel mounting assembly according to claim 3, in which the sealant is a polysulphide sealant and includes at least one of the following materials: 682 m sealant, Evode 2843 and 2813 sealant, and any other epoxy sealant.

5. A glass panel mounting assembly according to claim 1, wherein the panel has a second edge opposite to the first edge and further comprising a handrail portion provided along the second edge.

6. A balustrade run composed of a plurality of glass panel mounting assemblies according to claim 5, wherein the U-shaped holders are constituted by a common longitudinally extending element, and wherein the panels are arranged with a close spacing therebetween in the common U-shaped holder element.

7. a balustrade run according to claim 6, in which the hand rail portions of adjacent assemblies are coupled together to form means for providing mutual support against applied transverse loadings.

8. A glass panel mounting assembly which comprises:
   a glass panel which is resiliently deflectable and which has at least a first edge;

a U-shaped holder in which the first edge of the panel is securely mounted, said holder comprising a pair of substantially parallel metal limbs each having an inner face and a free end and which define a receiving channel in which the first edge is received;

adjustable securing means extending between the metal limbs and below the first edge in order to clamp the first edge between the metal limbs;

a hardwood packing, in which the first edge rests on the hardwood packing within the channel defined in the holder, to provide support for the weight of the panel prior to it being clamped by the adjustable securing means;

a pair of packings arranged one between each side of the first edge and the inner face o the respective adjacent limb of the holder, each packing being made of a material having a slight degree of resilience; and sealant material arranged substantially to fill the remainder of the channel which is defined between the free end of the limbs and the packings:

in which the arrangement of the U-shaped holder, the packings and the sealant material constitutes holding means for allowing the panel to be deflected resiliently under a transversely applied loading, from its unloaded position, about the mounting of the first edge in the holder and substantially without any permanent deformation of the holder, the packings and the sealant material, whereby the panel automatically restores itself to the unloaded position upon removal of the applied loading.

* * * * *